US008392290B2

(12) United States Patent
Rehman et al.

(10) Patent No.: US 8,392,290 B2
(45) Date of Patent: Mar. 5, 2013

(54) SELLER CONVERSION FACTOR TO RANKING SCORE FOR PRESENTED ITEM LISTINGS

(75) Inventors: Muhammad Faisal Rehman, San Jose, CA (US); Joseph Anthony Beynon, Mountain View, CA (US); Qian Zhong, San Jose, CA (US); Ryan McDonald, San Francisco, CA (US); Jingzhou Hua, Fremont, CA (US)

(73) Assignee: eBay Inc., San Jose, CA (US)

( * ) Notice: Subject to any disclaimer, the term of this patent is extended or adjusted under 35 U.S.C. 154(b) by 220 days.

(21) Appl. No.: 12/856,363

(22) Filed: Aug. 13, 2010

(65) Prior Publication Data

US 2012/0041846 A1    Feb. 16, 2012

(51) Int. Cl.
*G06Q 30/00* (2012.01)
(52) U.S. Cl. ............... 705/26.9; 705/26.1; 705/27.1; 705/27.2; 705/26.8
(58) Field of Classification Search .......... 705/26.9, 705/26.1, 27.1, 27.2, 26.8
See application file for complete search history.

(56) References Cited

U.S. PATENT DOCUMENTS

| 7,231,399 | B1* | 6/2007 | Bem et al. ............................. 1/1 |
| 2005/0060271 | A1* | 3/2005 | Vig ............................... 705/400 |
| 2007/0294127 | A1* | 12/2007 | Zivov .............................. 705/10 |
| 2008/0288348 | A1* | 11/2008 | Zeng et al. ..................... 705/14 |
| 2010/0262495 | A1* | 10/2010 | Dumon et al. ............. 705/14.54 |

OTHER PUBLICATIONS

"Make Money with your own online store" (Kim Komando. Gannett News Service. McLean: Jul. 12, 2007. p. 1).*

* cited by examiner

*Primary Examiner* — Jeffrey A Smith
*Assistant Examiner* — Courtney Stopp
(74) *Attorney, Agent, or Firm* — Schwegman Lundberg & Woessner, P.A.

(57) ABSTRACT

Various embodiments include a method and system for a seller conversion factor to ranking score for presented item listings. In an online marketplace with sellers and item listings, a first sum may be calculated by identifying a first set of item listings associated with the seller. A second sum may also be calculated by identifying a second set of item listings, where the second set is a subset of the first set and are successful item listings. Further, a conversion factor may be calculated from the first and second sums by dividing the second sum by the first sum. The conversion factor may then be used as a component in an item listing quality score for a third set of item listings associated with the seller.

11 Claims, 9 Drawing Sheets

SELLER CONVERSION FACTOR TO RANKING SCORE FOR PRESENTED ITEM LISTINGS

TECHNICAL FIELD

This document pertains generally to data processing techniques, and more particularly, but not by way of limitation, to managing how search results are processed and presented to a user of a computer-based trading, e-commerce, or online publication application.

BACKGROUND

Advancements in computer and networking technologies have enabled persons to conduct commercial and financial transactions "on-line" via computer-based applications. This has given rise to a new era of electronic commerce (often referred to as e-commerce). A number of well-known retailers have expanded their presence and reach by operating websites that facilitate e-commerce. In addition, many new retailers, which operate exclusively online, have come into existence. The business models utilized by enterprises operating online are almost as varied as the products and services offered. For example, some products and services are offered at fixed prices, while others are offered via various auction methods, and still others are offered via a system of classified ad listings. Some enterprises specialize in the selling of a specific type of product (e.g., books) or a specific service (e.g., tax preparation), while others provide a myriad of categories of items and services from which to choose. Some enterprises serve only as an intermediary, connecting sellers and buyers, while others sell directly to consumers.

Despite the many technical advances that have improved the state of e-commerce, a great number of technical challenges and problems remain. One such problem involves determining how to best present products and services (e.g., items) that are being offered for sale, so as to maximize the likelihood that a transaction (e.g., the sale of a product or service) will occur. For example, when a potential buyer performs a search for a product or service, it may often be the case that the number of item listings that satisfy the potential buyer's query far exceeds the number of item listings that can be practically presented on a search results page. Furthermore, it is well established that the presentation of an item listing in a search results page—for example, the order or placement of the item listing in a list of listings, the font, font size, or color of the listing, and so on—can affect whether potential buyers select the listing, and ultimately purchase the listed product or service.

For enterprises that serve as an intermediary—for example, by connecting buyers with sellers—it is generally desirable that the presentation of item listings occur in a fair manner that strikes a balance between the needs and desires of the various sellers, the buyers or potential buyers, and the enterprise itself. If a preference is given to one seller, such that the one seller's item listings are consistently being presented in the most prominent position(s) on a search results page, other sellers may not participate, which will ultimately have a negative impact on the enterprise. Similarly, if item listings are presented in accordance with an algorithm that is too rigid and that cannot easily be altered or tweaked, such as a first-listed first-presented algorithm, some sellers may attempt to game the system, again negatively impacting other sellers, the potential buyers' experience, and ultimately the enterprise itself. Furthermore, using a simple and rigid algorithm for presenting item listings prevents the enterprise from optimizing the presentation of item listings to improve the overall conversion rate for item listings. This may lead potential buyers to shop elsewhere, which ultimately will negatively affect the e-commerce enterprise.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Sellers in online marketplaces may attempt to game the online marketplace's systems used to present and order item listings returned by buyer searches. For example, if the online marketplace offers both fixed-price and auction based listings, and auction listings cost little, sellers may list auctions which are never intended to create a sale, but rather to advertise or drive traffic to the seller's fixed price listings. In another example, if the online marketplace pre-processes various factors of its presentation and ordering algorithms, and these pre-processed factors are not re-processed in certain follow-on actions (e.g., relisting the same item), sellers may create an initial listing containing information to influence the pre-processed factors in their favor (e.g., the seller may list the item with an artificially low price), and then re-list the item with their desired information (e.g., the price the seller really wants for the item). Seller behaviors such as these may frustrate the online marketplace's goal of presenting item listings in a fair manner that strikes a balance between the needs and desires of the various sellers, the buyers or potential buyers, and the online marketplace itself in order to connect buyers and sellers.

To deter sellers from using straw listings—listings that are not intended to generate sales—to drive buyers to other listings the sellers hope will end in a transaction, it may be advantageous to use the seller's listing behavior along with historical transaction data, to penalize many of the listings of abusive sellers. For example, for a given seller, successful listings (e.g., those listings ending in a sale) may be compared with the total number of listings active within a predetermined period of time. The comparison, known as the seller conversion factor, may indicate seller abuse when the ratio between the two numbers becomes large. By computing a value from the two numbers, the value may be used in the online marketplace's listing presentation and ranking algorithms to automatically penalize the listings of the abusive seller, thereby discouraging the practice.

Methods and systems for seller conversion factor to ranking scores for presented item listings are herein described. In the following description, for purposes of explanation, numerous specific details are set forth in order to provide a thorough understanding of the various aspects of different embodiments of the present subject matter. It will be evident, however, to one skilled in the art, that the present subject matter may be practiced without these specific details.

System Architecture

Figure 1:
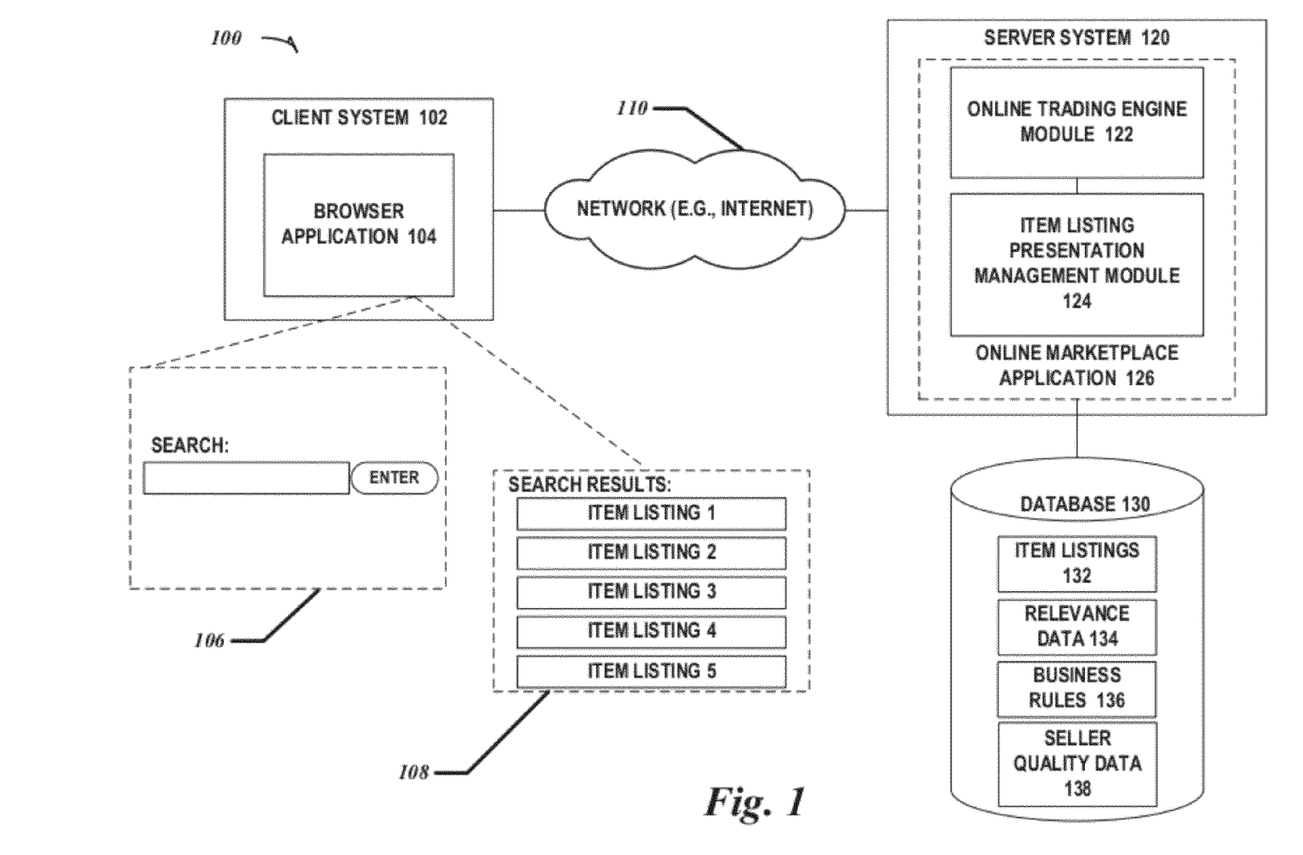
FIG. 1 illustrates an example network environment including a network-connected client system and server system, with which a seller conversion factor may be used as a ranking score factor for presenting item listings to a buyer.

FIG. 1 is a block diagram illustrating an example network environment 100 with which a seller conversion factor may be used as a ranking score factor for presenting item listings to a buyer. The network environment 100 may include a network connected client system 102, server system 120, and database 130. The client system 102 may include a browser application 104. The server system 120 may include an online marketplace application 126. The online marketplace application 126 is shown to include two modules, an online trading engine module 122 and an item listings presentations management module 124, although the online marketplace application 126 may include other modules to implement various aspects of its operations.

In some embodiments the online trading engine module 122 may consist of a variety of sub-components or modules, which provide some of the functions of an online marketplace application 126. Each module may be comprised of software instructions, computer hardware components, or a combination of both. To avoid unnecessary detail, only a few of the online trading engine functions (germane to the present subject matter) are described herein. For example, the online trading engine module 122 may include an item listing management module (not shown) that facilitates the receiving and storing of data representing item attributes, which collectively form an item listing. When a seller desires to list a single item, or multiple items, for sale, the seller may provide information about the item(s) (e.g., item attributes). Such information may be submitted via one or more forms of one or more web pages, or via drop down lists, or similar user interface elements. In some embodiments, the item information may be automatically populated after the seller selects the item from a catalog; i.e., a catalog based system of item information. The item listing management module may receive the item attributes and stores the item attributes together within a database 130 as an item listing 132. In some embodiments, the item listings may be stored in an item listing database table. Item attributes of each item listing may be analyzed to determine a ranking score assigned to item listings and used in determining the position of item listings when the item listings are being presented in a search results page.

The online trading engine module 122 may also include one or more modules for receiving and storing historical data that is used to measure the likelihood that an item listing will, if presented in a search results page, result in a transaction being concluded. For example, in some embodiments, data associated with user-initiated activities are analyzed and captured for the purpose of predicting future user activities. If a user submits a search request including certain search terms, and then proceeds to conclude a transaction for a particular item (e.g., purchase the item), information from the user's interaction with the online trading application will be captured and stored for the purpose of predicting future actions by other users. Some of the data used in this capacity is generally referred to as relevance data 134 because it is used to determine a measure of relevance between search terms used in a search query, and individual item listings. For example, if a potential buyer submits a search request with the search terms, "mobile phone", item listings that have certain item attributes are more likely to result in the conclusion of a transaction if presented in a search results page in response to the search request. For example, continuing with the example search terms, "mobile phone", given the specific search terms used in the search query, item listings that have been designated as being in a certain category of items, such as "Electronics", or even more specifically, "Mobile Phones", are more likely to result in a transaction if presented in a search results page than item listings in other categories, for example, such as "Automobiles" or "Jewelry". Similarly, given the search terms, "mobile phone", item listings with titles that include the search terms may prove more likely to result in a transaction than item listings without the search terms in the title. Accordingly, in some embodiments, the online tradingengine 122 may include one or more modules for receiving and analyzing historical data to generate what is referred to herein as relevance data 134. The relevance data may be used to derive a measure of the likelihood that item listings with certain item attributes will result in a transaction if displayed in response to certain search terms being submitted in a search request. The relevance data 134 may be derived and used as described in patent applications, U.S. application Ser. No. 11/679,973, entitled, "DETERMINING RELEVANCY AND DESIRABILITY OF TERMS", filed on Feb. 28, 2007, and U.S. application Ser. No. 11/821,928, entitled, "ECONOMIC OPTIMIZATION FOR PRODUCT SEARCH RELEVANCY", filed on Jun. 26, 2007, both of which are incorporated herein by reference.

The online trading engine module 122 may also include one or more modules for receiving and storing data representing, among other things, a measure of a seller's performance, including seller obligations associated with transactions in which the seller has participated. For example, in some embodiments, when a transaction is concluded, a buyer may be prompted to provide feedback information concerning the performance of a seller. The buyer may, for example, rate the accuracy of the seller's description of an item provided in the item listing. For example, if the item received by the buyer is in poor condition, but was described in the item listing as being in good condition, the buyer may provide feedback information to reflect that the seller's description of the item in the item listing was inaccurate. This information may be used in a variety of ways to derive a ranking score for an item listing. For example, in some cases, the seller feedback information may be used to determine a ranking score for another item listing of the same seller. Such information may be stored, for example, in database 130, as indicated in FIG. 1 by the seller quality data 138.

As illustrated in FIG. 1, the database 130 is also shown to include business rules data 136. The business rules data 136 may be managed and used by a business rules management module (not shown) for the purpose of promoting and/or demoting item listings that satisfy a search query. For example, when determining the order or arrangement of item listings for presentation on a search results page, an item listing may be promoted—presented in a more prominent position—or, demoted—presented in a less prominent position—based on the evaluation of a business rule that is dependent upon certain business rule data 136. Business rules may be used to promote certain business policies and to impact user's behavior. For example, a business rule that provides a promotion to item listings that are offering free shipping will likely have the effect of persuading sellers to offer free shipping to have their item listings appear in the most prominent positions of the search results page. Similarly, demoting item listings based on negative seller feedback information will typically motivate sellers to perform their obligations as agreed upon.

Figure 2:
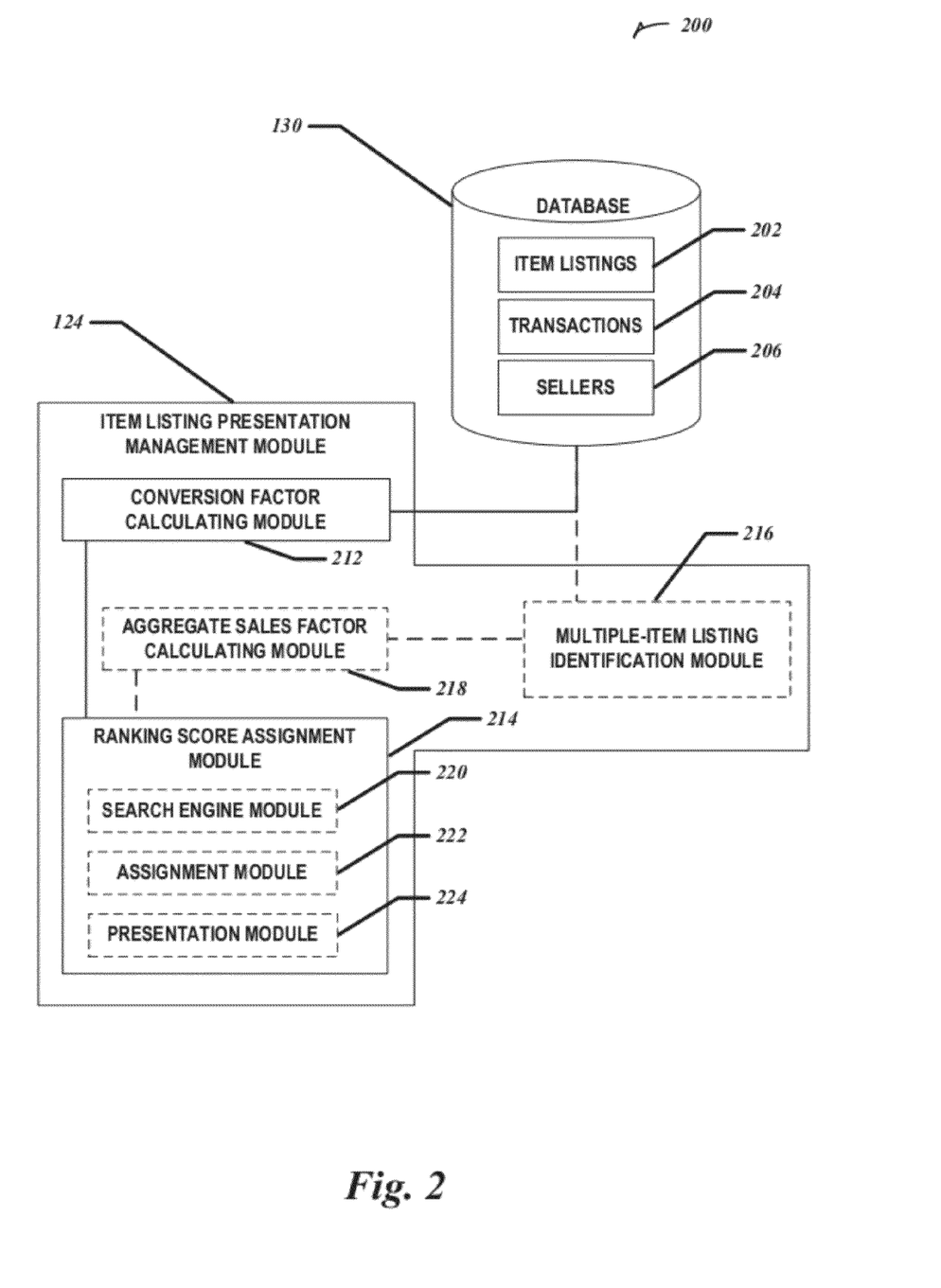
FIG. 2 is a block diagram illustrating an example of various functional components or modules according to one embodiment.

The item listing presentation management module 124, which is described more completely in connection to FIG. 2, may provide logic used to assign a ranking score (sometimes referred to as a Best Match Score) to item listings that satisfy a search query, and to use the ranking score to determine the order of item listings when the item listings are presented in a search results page.

For example, in some embodiments, a user operates a web browser application 104 on a client system 102 to interact with the online marketplace application 126 residing and executing on the server system 120. As illustrated by the example user interface with reference number 106, a user may be presented with a search interface 106, with which the user can specify one or more search terms to be used in a search request submitted to the online marketplace application 126. In some embodiments, in addition to specifying search terms, users may be able to select certain item attributes, such as the desired color of an item, the item categories that are to be searched, and so on. After receiving and processing the search request, the online marketplace application 126 may communicate a response to the web browser application 104 on the client system 102. For example, the response may be a Hypertext Markup Language ("HTML") document or web page that, when rendered by the browser application 104, displays a search results page 108 showing several item listings that satisfy the user's search request. As illustrated in the example search results page 108 of FIG. 1, the item listings are arranged or positioned on the search results page in an order determined by the item listing presentation management module 124. The item listings are, in some embodiments, presented by a presentation module, which may be a web server or an application server.

In general, the item listings are presented in the search results page 108 in an order based on a ranking score that is assigned to each item listing that satisfies the query. In some embodiments, the item listings will be arranged in a simple list, with the item listing having the highest ranking score appearing at the top of the list, followed by the item listing with the next highest ranking score, and so on. In some embodiments, several search results pages 108 may be required to present all item listings that satisfy the query. Accordingly, only a subset of the set of item listings that satisfy the query may be presented in the first page of the search results pages 108. In some embodiments, the item listings may be ordered or arranged in some other manner, based on their ranking scores. For example, instead of using a simple list, in some embodiments the item listings may be presented one item listing per page, or, arranged in some manner other than a top-down list.

The ranking score may be based on several component scores including, but by no means limited to: a relevance score, representing a measure of the relevance of an item listing with respect to search terms provided in the search request; a listing quality score, representing a measure of the likelihood that an item listing will result in a transaction based at least in part on historical data associated with similar item listings; and a business rules score, representing a promotion or demotion factor determined based on the evaluation of one or more business rules. As used herein, a component score is a score that is used in deriving the overall ranking score for an item listing. However, a component score in one embodiment may be a ranking score in another embodiment. For example, in some embodiments, the ranking score may be equivalent to a single component score, such as the listing quality score. A more complete recitation of ways in which the ranking score may be obtained and used is described in U.S. application Ser. No. 12/476,046, entitled, "METHODS AND SYSTEMS FOR DERIVING A SCORE WITH WHICH ITEM LISTINGS ARE ORDERED", filed on Jun. 1, 2009, which is incorporated herein by reference.

In some embodiments, the item listing presentation management module 124 may calculate one or more seller conversion factors based on historical transaction information and the seller's listing behavior. For example, a seller's successful transactions may be divided by the total active transactions during a predetermined time period to produce a seller conversion factor. The seller conversion factor may then be used as a component, or sub-component, score in the ranking score, such as the item listing quality score for items associated with the seller. In some embodiments the conversion factor may not influence the ranking score until it passes a predetermined value, after which it may demote the listings, or a subset thereof, of the seller. In some embodiments, the calculation of the conversion factor may change depending on the nature of the listing (e.g., auction listings and fixed-price listings). For example, a fixed-price listing may include multiple items, each of which is to be sold at the fixed price, a situation generally not compatible with auction listings. In some embodiments, a conversion factor may aggregate the sales data in a multiple-item listing—that is, treat it as a single listing rather than an individual listing for each item—by dividing the number of sales by the number of impressions—the number of times the multiple item listing has appeared to users in search results—the result of which may be known as aggregated sales over impression. Aggregated sales over impression may be another factor to the item listing quality scores of a seller's items that are not appropriate to auction listings due to the varying natures of auction and fixed-price listings.

FIG. 2 is a block diagram illustrating an example system 200 of various functional components or modules according to one embodiment. System 200 may include an item listing presentation management module 124 and a database 130. The item listing presentation management module 124 may include a conversion factor calculating module 212 and a ranking score assignment module 214. In some embodiments the item listing presentation management module 124 may include other modules and may be arranged differently, in order to fully support the ranking score of listings. The database 130 may include item listings 202, transactions 204 (e.g., data pertaining to listings and sales), and seller data 206.

In some embodiments the conversion factor module 212 may be communicatively coupled to the database 130 in order to calculate the seller conversion factor. In other embodiments, the data may be collected from the database 130 by another module, including batch operations to aggregate data into a data warehouse, for example. The conversion factor calculating module 212 may be configured to calculate a first sum by identifying a first set of item listings associated with a seller. This first set of item listings may be a subset of all of the seller's listings. In some embodiments the first set of item listings may be limited to auction listings associated with the seller. In other embodiments the first set of item listings may be fixed-price listings associated with the seller. In some embodiments the first set of item listings may include fixed price listings that are active, or auction listings that have ended, within a predefined time period prior to calculating the conversion factor. For example, the first set of item listings may include all of a seller's auction listings that have ended within sixty days of the seller conversion factor calculation. Other time periods, such as thirty or ninety days are also contemplated.

The conversion factor calculating module 212 may also calculate a second sum by counting a second set of item listings where the second set of item listings is a subset of the first set of item listings and correspond to successful item listings. In some embodiments, successful item listings are item listings that have concluded in a sale of an item. However, other measures of success may be used, including, for example, a purchase agreement.

The conversion factor calculating module 212 may calculate the seller conversion factor from the first and second sums. In some embodiments the second sum is divided by the first sum. In some embodiments the seller conversion factor may be stored as meta-data associated with the seller, such as in the seller quality data 138 in database 130. The term meta-data may mean data about data. For example, the seller conversion factor may be data about seller listing and transaction data. In some embodiments a calculated seller conversion factor may be combined with other seller conversion factors to produce a mean seller conversion factor for a group of item listings. In some embodiments the mean seller conversion factor may be stored as meta-data in, for example, the item listings 132 in database 130. In some embodiments, the group may be defined as a category of items, such as "electronics" and the meta-data may be associated with that category.

In some embodiments the ranking score assignment module 214 may receive the seller conversion factor from the conversion factor calculating module 124. In other embodiments the ranking score assignment module 214 may retrieve the seller conversion factor from storage, such as database 130. The ranking score assignment module 214 may use the seller conversion factor as a component in an item listing quality score for a third set of item listings associated with the seller. In some embodiments the third set of item listings includes all active listings of the seller, including both auction and fixed-price listings.

In some embodiments the ranking score assignment module 214 may optionally include a search engine module 220, an assignment module 222, and a presentation module 224. In other embodiments these modules may be external to the ranking score assignment module 214 in system 200.

The search engine module 220 may process search queries from users to identify item listings that satisfy the query. In some embodiments, the search engine module 220 provides the actual search function. For example, the search engine module 220, in some embodiments, receives and processes a search request to identify the item listings that satisfy the search request. It will be appreciated by those skilled in the art that a variety of search techniques may be implemented to identify item listings that satisfy a search request. In general, however, the item attributes of item listings are analyzed for the presence of the user-provided search terms. For example, in some embodiments, the title and/or user-provided item description are searched for the presence of search terms included in the search query. In some examples, particularly when a user is performing an advanced search, other item attributes such as a user-specified category for the item listing may be used to identify item listings satisfying the search query. The exact methods and algorithms used to execute a search, however, are beyond the scope of the present application.

In an alternative embodiment, the search engine module 220 may represent an interface to a search engine implemented as an external component or module, for example, as part of the online trading engine module 122, or as a separate external module. In such a scenario, the search engine module 220 may simply receive the set of item listings that satisfy a search query.

The assignment module 222 may assign a ranking score to each of the item listings that satisfy a search query, using the seller conversion score as a component in an item listing quality score for each of the item listings that satisfy the search query. In some embodiments the assignment module implements methods and systems described in U.S. application Ser. No. 12/476,046, entitled, "METHODS AND SYSTEMS FOR DERIVING A SCORE WITH WHICH ITEM LISTINGS ARE ORDERED", filed on Jun. 1, 2009, to assign the ranking score, using the seller conversion factor as one component of an item listing quality score. In some embodiments the seller conversion factor demotes an item listing's position in the search results if the conversion factor crosses a predefined value, otherwise leaving the item listing's position undisturbed. In some embodiments the conversion factor crosses the predefined value when it exceeds the predefined value. In other embodiments the seller conversion factor crosses the predefined value when it falls below the predefined value. For example, if the seller conversion factor is 0.2, and the predefined value is 0.5, the item listing may drop in the ordered list of the user presented item listings, whereas a seller conversion rating of 0.6 would not cause such a drop. In some embodiments, the demotion may be fixed (e.g., move down 2 places in the search results), stepped (e.g., move down a fixed number of places for each increment of the seller conversion factor), or it may be a ratio of the seller conversion factor to the predefined value. Thus, the predefined value acts as a threshold, detecting and deterring abuse by sellers. In some embodiments the seller conversion factor is calculated before the query is processed to identify item listings satisfying the query. For example, the seller conversion factor calculation may be performed periodically (e.g., month to month, year to year, etc.), or it may be performed episodically (e.g., when a seller initiates a new item listing).

In some embodiments, the presentation module 224, which may be a document or page generator, a web server, or application server, facilitates that actual presentation of the search results page containing the search results.

In some embodiments the item listing presentation management module 124 additionally includes an aggregate sales factor calculating module 218 and a multiple-item listing identification module 216. In other embodiments, the item listing presentation management module 124 replaces the conversion factor calculating module 212 with the aggregate sales factor calculating module 218.

The multiple-item listing module 216 may identify multiple-item item listings within the fixed-price item listings associated with a seller. The multiple-item item listings each offering for sale a plurality of equivalent items. Item equivalence may be determined based on common attributes of the items such that they may be grouped together in a single listing. For example, items may share a common item identification, or may vary only in color (e.g., a red backpack and a blue backpack). Equivalent items will generally be the same or very similar items. In some embodiments the multiple-item item listings will be a single listing with multiple items sold separately, the listing capable of remaining active until all of the items are sold. In other embodiments, a multiple-item item listing may be comprised of several related listings. For example, an online marketplace may allow a seller to create a listing based off of a first listing. The subsequent listings may inherit attributes of the first listing, possibly including pre-calculated component values used in the ranking score. This may allow a seller to create a first listing designed to maximize its ranking score, which may also be a poor listings from an economic standpoint (e.g., its price is very low). The seller may then create derivative listings, possibly inheriting the favorable ranking score attributes of the first listing, but with more favorable economic terms for the seller. Then, the seller may end the first listing. In this way, the seller's listing behavior is designed to game the ranking score system, at the possible expense of system resources to list and re-list the same item, with no benefit to buyers or the online marketplace. In some embodiments the identified multiple-item item listings may be passed directly to the aggregate sales factor calculating module 218 or they may be placed in storage, such as database 130, accessible to the aggregate sales factor calculating module 218.

The aggregate sales factor calculating module 218 may calculate an aggregate sales factor from the identified multiple-item item listings. The aggregate sales factor calculating module 218 may calculate an aggregate sales value for the multiple-item item listings by identifying the number of sales within each multiple-item item listing. For example, if a multiple-item item listing contained fourteen items, and four have sold, the aggregate sales value would be four.

The aggregate sales factor calculating module 218 may also calculate an impressions value for each of the multiple-item item listings by counting the number of impressions associated with each of the multiple-item item listings—an impression being an opportunity for a listing to be viewed by a user. For example, if a listing appears once within the search results visible to a user, the listing will have one impression. Impressions are generally based on the listing, and not the user, such that two users each viewing the listing once will result in two impressions. Impression data may be stored in database 130.

The aggregate sales factor calculating module 218 may then calculate an aggregate sales score using the aggregate sales value and the impressions value by dividing the aggregate sales value by the impressions value, sometimes known as aggregated sales over impressions. As with the seller conversion factor previously discussed, in some embodiments the aggregate sales factor may be stored in, for example, database 130, as meta-data associated with a seller. In some embodiments the aggregate sales factor may be combined with other aggregate sales factors to produce a mean aggregate sales factor for a group of item listings. In some embodiments the mean aggregate sales factor may be stored as meta-data in, for example, the item listings 132 in database 130. In some embodiments, the group may be defined as a category of items, such as "electronics", and the meta-data may be associated with that category.

In some embodiments, when the aggregate sales calculating module 218 is present, the ranking score assignment module 214 may additionally take the aggregate sales factor as a component in the item listing quality score discussed in detail above. In other embodiments, when the aggregate sales calculating module 218 replaces the conversion factor calculating module 212, the ranking score assignment module 214 may take the aggregate sales factor as a component in the item listing quality score discussed in detail above.

Seller Conversion Factor

As noted above, the seller conversion factor may be calculated by comparing a first set of a seller's listings with a second set, within the first, of listings.

Figure 3:
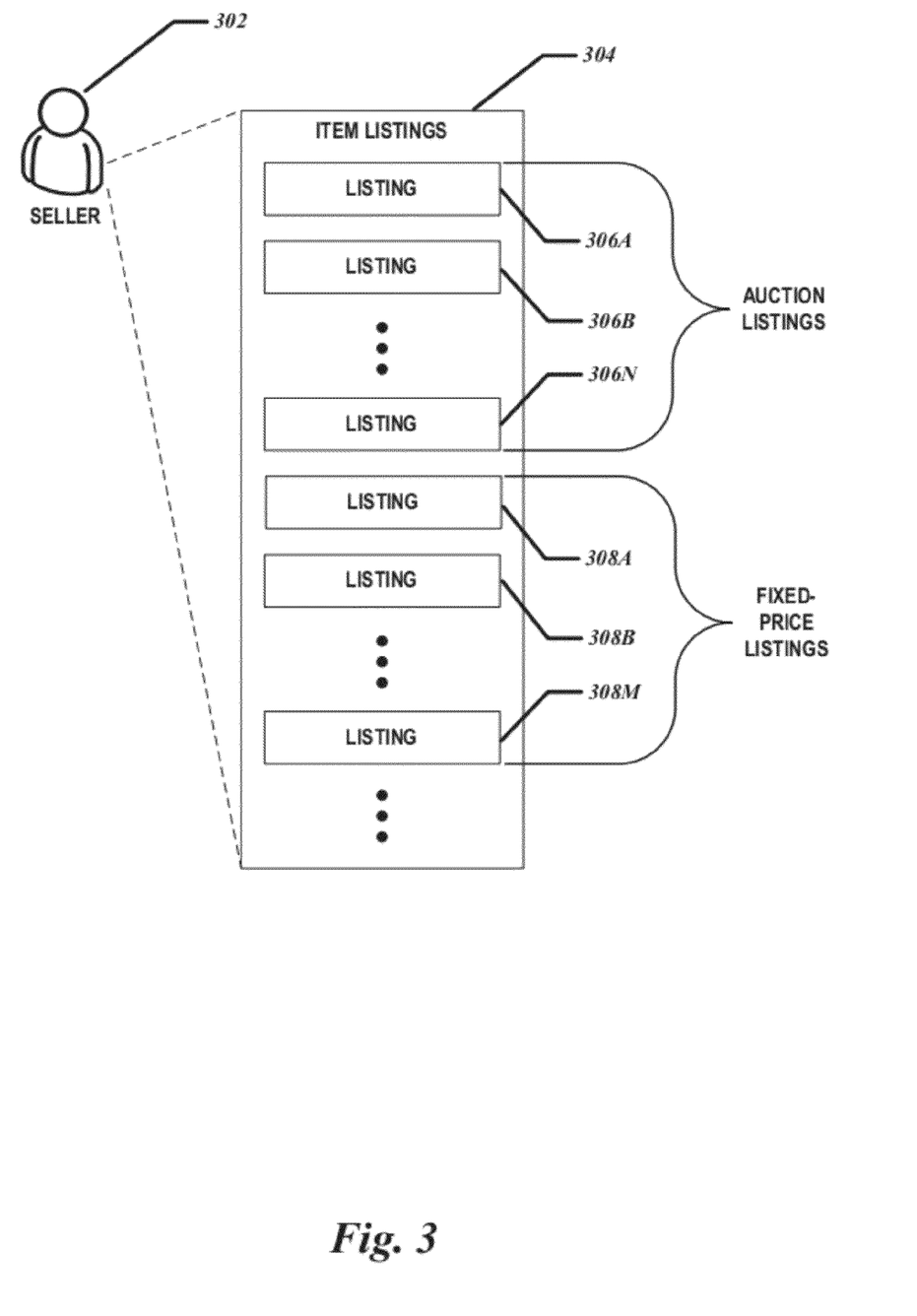
FIG. 3 illustrates an example set of item listings associated with a seller.

FIG. 3 illustrates an example set of item listings 304 associated with a seller 302. The set of item listings 304 may include auction listings 306A-306N, fixed-price listings 308A-308M, or any combination of both.

Figure 4A:
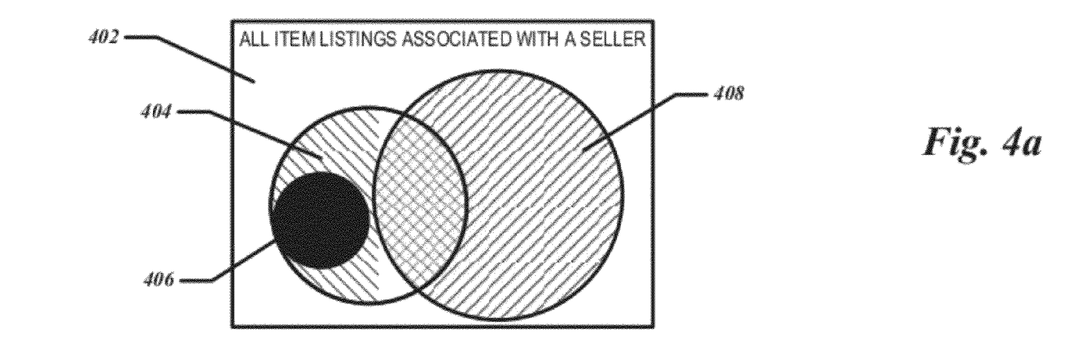
FIG. 4a illustrates a set diagram of seller item listings which, according to one embodiment, may be used in calculating a seller conversion factor.

FIG. 4a illustrates a set diagram of seller 302 item listings 304 which, according to one embodiment, may be used in calculating a seller conversion factor. Box 402 represents the complete set of a seller's 302 item listings 304. Circle 404 represents the first set of item listings 304, mentioned above, the count of which may constitute the denominator in the seller conversion factor. Circle 406 represents the second set of item listings 304, a subset of the first set 404, the count of which may be the numerator in the seller conversion factor. Circle 408 represents the third set of item listings 304, which are the item listings to which the seller conversion factor may apply. In some embodiments, the item listings 304 in 408 may be all of the active listings for the seller 304, including both auction and fixed-price listings. In other embodiments, 408 may be exclusively auction listings or fixed-price listings. In some embodiments, the item listings 304 in 404 may be limited to seller 302 listings that were active, or closed; within a predefined period of time preceding the seller conversion factor calculation. For example, only active listings for the preceding thirty, sixty, or ninety days may be in 404.

Figure 4B:
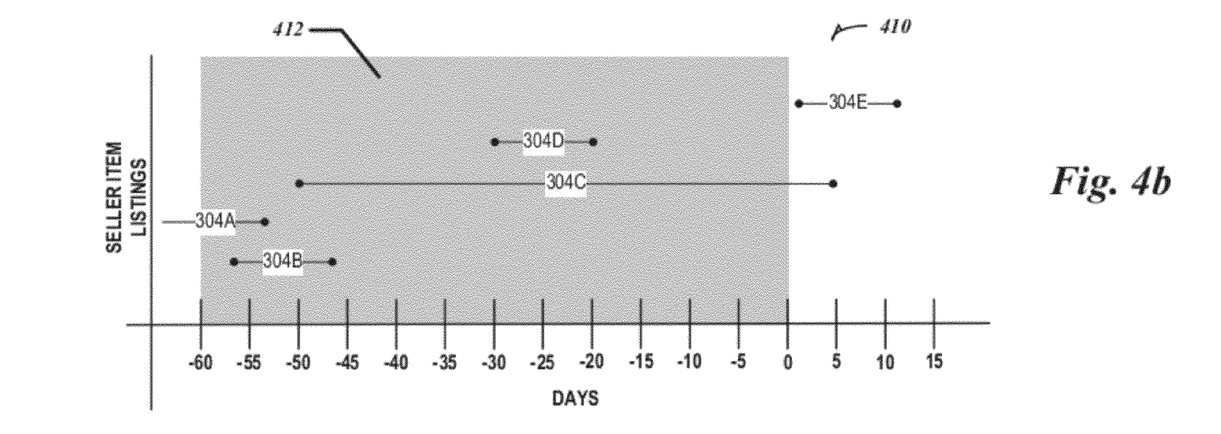
FIG. 4b illustrates a timeline showing when item listings associated with a seller are active with respect to a reference point.

FIG. 4b illustrates a timeline 410 showing when item listings 304 associated with a seller 302 are active, or have ended, with respect to a reference point. The horizontal lines 304A-304E indicate the time span a given item listing is active. The shaded region 412 indicates the predefined period of time preceding the reference point of 0 days. Example, item listings 304B and 304D have their lifecycles completely within the time period 412. Example, item listing 304E is neither active nor ends within the time period 412. Example, item listing 304A is both active and ends within the time period 412 even though it began outside of the time period 412. Example item listing 304C is active within the time period 412 but does not end within the time period 412. In some embodiments the predefined time period 412 may be any number of units, including, for example, 30 days, 2 months, or 1 year. By limiting the time period within which item listings 304 fall into the first subset 404 the seller conversion factor may both discourage abusive seller 302 behavior while automatically recognizing reformed seller 302 behavior through the passage of time.

Figure 5:
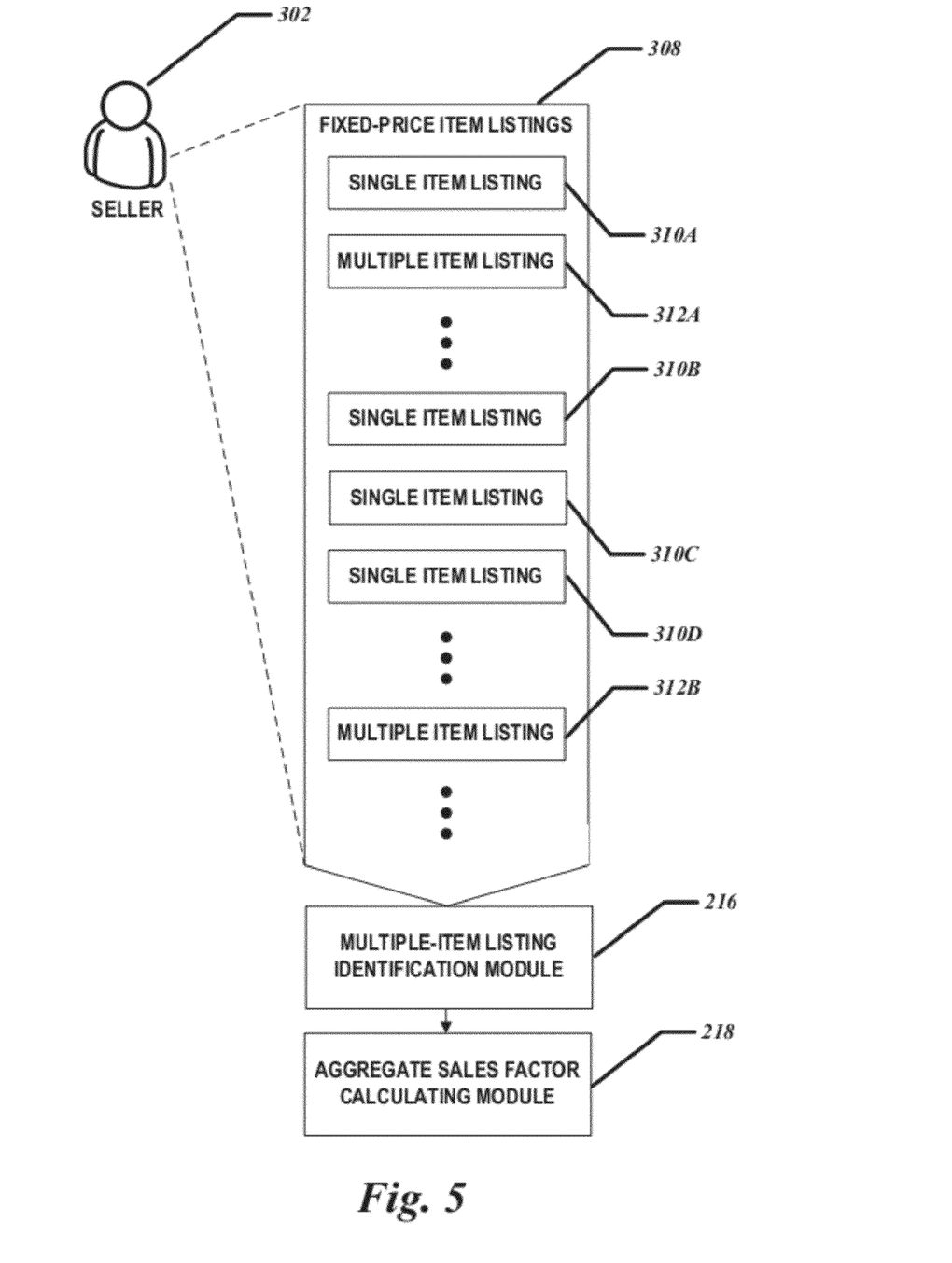
FIG. 5 illustrates an example set of fixed-price item listings associated with a seller including multiple-item listings.

FIG. 5 illustrates an example set of fixed-price item listings 308 associated with a seller 302. The set 308 may include single item listings 310A-310D as well as multiple-item listings 312A-312. In some embodiments, the items within a multiple item listing 312 are equivalent to each other. Example equivalence tests may include a common attribute, such as an item identification number, whether the items are fungible, or items that vary in insignificant details (e.g., electronic music players in different colors). In some embodiments the multiple item listings 312 may be logically created from a number of related single item listings 310. For example, if the seller 302 is permitted by the online marketplace application 126 to create derivative listings from a parent listing, each may be a single item listing 310 and combined together to constitute a multiple item listing 312. In other embodiments, a multiple item listing is a single listing containing a plurality of items. In some embodiments, the multiple-item listing identification module 216 may find, or possibly construct, the multiple item listings 312 from within the set of fixed-price item listings 308. In some embodiments, the multiple-item listing identification module 216 may limit its identifications to fixed-price item listings 308 that are active within the predefined time period 412. In some embodiments, the identified multiple item listings 312 may be made available to the aggregate sales factor calculating module 218.

Figure 6:
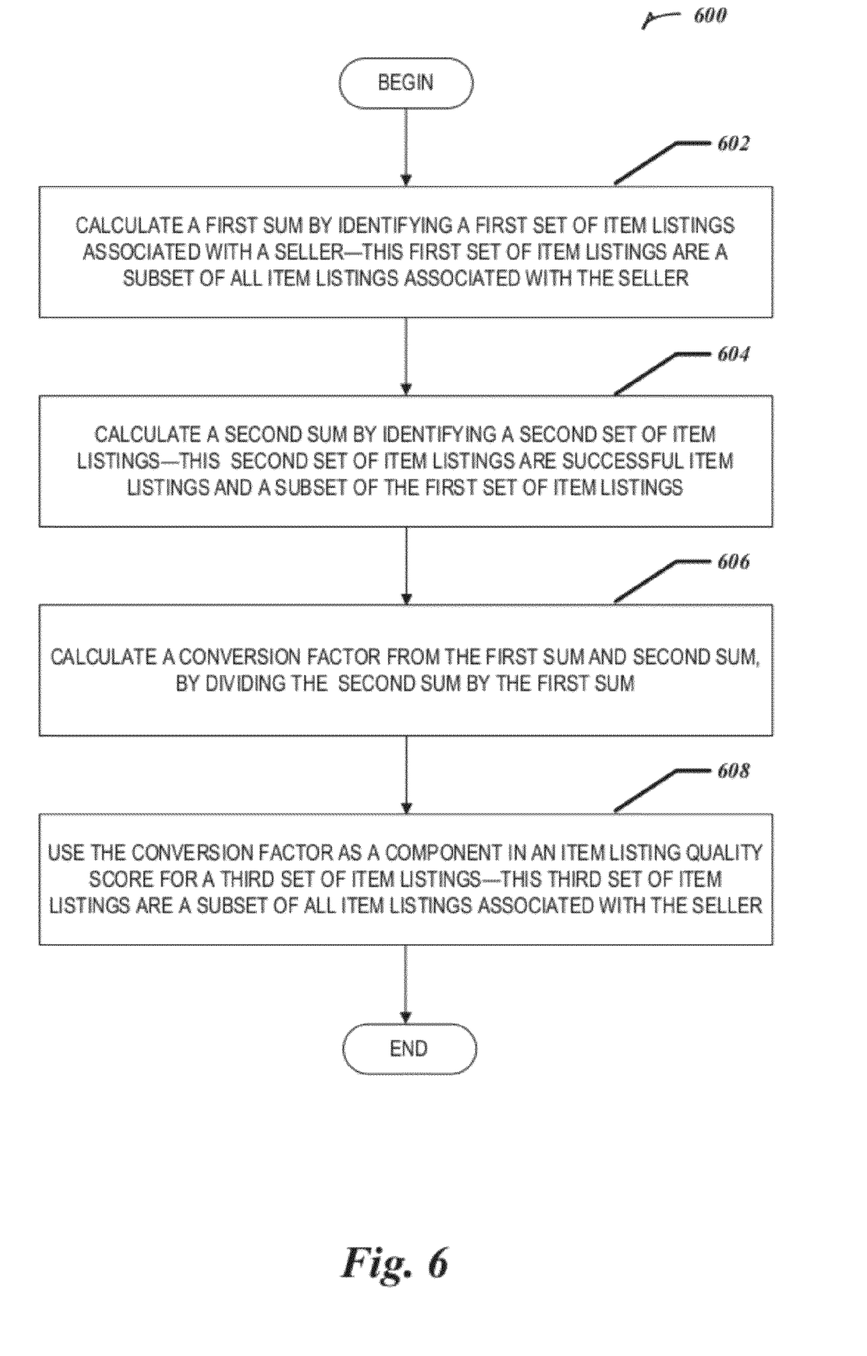
FIG. 6 illustrates an example method of calculating a seller conversion factor and using it as a ranking score factor for presenting item listings.

FIG. 6 illustrates an example method 600 of calculating a seller conversion factor and using it as a ranking score factor for presenting item listings. Various components and modules from FIGS. 1-5 may be used to illustrate method 600, however it will be understood that other modules, or arrangements of modules are contemplated.

At 602 a first sum may be calculated by identifying a first set 404 of item listings 304 associated with a seller 302. This first set 404 is a subset of all item listings associated with the seller 402. In some embodiments the first set 404 may be item listings offered via auction 306. In some embodiments the first set 404 may be item listings offered via fixed-price 308. In some embodiments the first set 404 may be item listings 304 that have ended within a predefined time period 412 prior to calculating the conversion factor. In some embodiments the first set 404 may be item listings 304 that are active within a predefined time period 412 prior to calculating the conversion factor. In some embodiments the predetermined time period may be 60 days, however, other periods of time, such as 90 days or 1 year, are also contemplated.

At 604 a second sum may be calculated by identifying a second set 406 of item listings 304. The second set 406 are successful item listings 304 and a subset of the first set 404. In some embodiments a successful item listing 304 is an item listing 304 ending in a sale. In some embodiments a successful item listing 304 may conclude in some other transaction, such as a purchase agreement.

At 606 the conversion factor may be calculated from the first sum and the second sum by dividing the second sum by the first sum. In some embodiments the conversion factor may be stored as meta-data associated with the seller 302. In some embodiments a mean value for the conversion factor may be calculated from a plurality of conversion factors associated with sellers. The mean value may be stored in meta-data for a category associated with items associated with the sellers. For example, a mean value seller conversion factor may be calculated for an item category (e.g., "electronic music players"), by combining the seller conversion factors for each seller of "electronic music players" and dividing by the number of conversion factors. This may provide a baseline from which to judge seller behavior in an item category, or to compare seller behavior across item categories.

At 608 the conversion factor may be used as a component in an item listing quality score for a third set 408 of item listings 304. The third set 408 are a subset of all item listings associated with the seller 402. In some embodiments the conversion factor may be included in a ranking score for an item listing 304, described in more detail below with respect to FIG. 8. In some embodiments the third set 408 may include all active item listings 304 associated with the seller 302, including both auction listings 306 and fixed-price listings 308.

By calculating a seller conversion factor and applying it to the seller's 302 listings, abusive seller listing behavior may be curbed. For example, if a seller 302 creates a number of auction listings 306 that are not intended to end in completed transactions, but rather to advertise the seller's 302 fixed-price listings 308, the large number of auction listings 306 will negatively affect the seller's conversion factor penalizing the seller's 302 possibly high-quality fixed-price listings 308.

Figure 7:
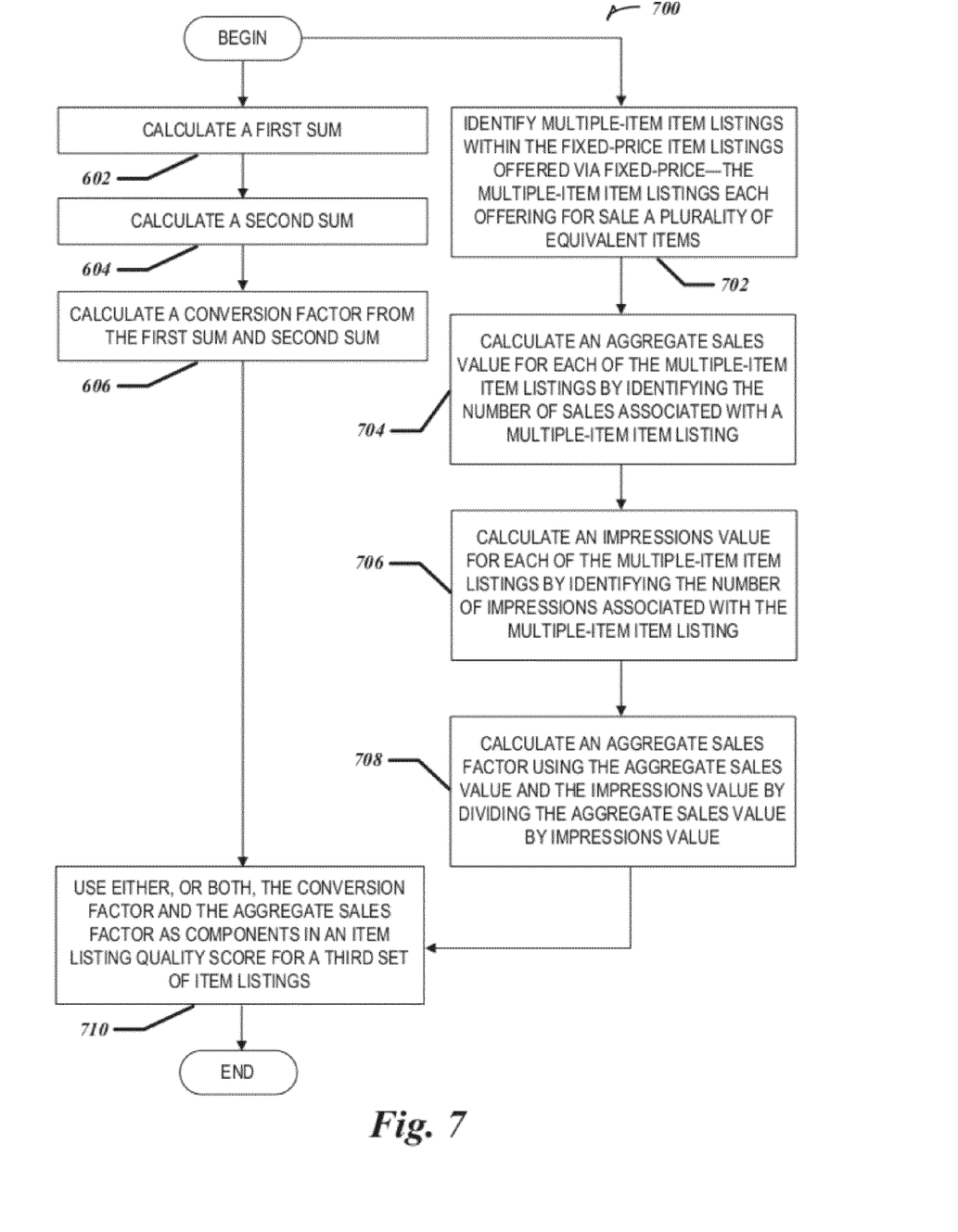
FIG. 7 illustrates an example method of calculating both a seller conversion factor and an aggregate sales factor and using them as ranking score factors for presenting item listings.

FIG. 7 illustrates an example method 700 of calculating both a seller conversion factor and an aggregate sales factor and using them as ranking score factors for presenting item listings. Although FIG. 7 shows both the seller conversion factor and aggregate sales factor being calculated and used as ranking score factors, the aggregate sales factor may be separately calculated and used alone. That is, the seller conversion factor need not be calculated to calculate and use the aggregate sales factor as described below at 702, 704, 706, 708, and 710.

At 602, 604, and 606, the method proceeds as previously described with respect to FIG. 6.

At 702 multiple-item item listings 312 may be identified within the fixed-price item listings 308 associated with the seller 302. In some embodiments, identifying the multiple-item item listings 312 may be carried out by the multiple-item listing identification module 216, or other modules. In some embodiments, the multiple-item item listings 312 each offer for sale a plurality of equivalent items. In some embodiments, item equivalence is as described with respect to FIG. 5. In some embodiments the multiple-item item listings 312 may be logically constructed from related single item listings 310, as described with respect to FIG. 5.

At 704 an aggregate sales value may be calculated for each of the multiple-item item listings 312 by identifying the number of sales associated with a multiple-item item listing 312.

At 706 an impressions value for each of the multiple-item item listings 312 may be calculated by identifying the number of impressions associated with the multiple-item item listing. In some embodiments, an impression occurs each time an item listing appears to a user in a search result, as previously described with respect to FIGS. 1 and 2.

At 708 an aggregate sales factor may be calculated using the aggregate sales value and the impressions value by dividing the aggregate sales value by the impressions value. As with the conversion factor previously discussed with respect to 606, in some embodiments the aggregate sales factor may be stored in, for example, database 130, as meta-data associated with the seller 302. In some embodiments the aggregate sales factor may be combined with other aggregate sales factors to produce a mean aggregate sales factor for a group of item listings 304. In some embodiments the mean aggregate sales factor may be stored as meta-data in, for example, the item listings 132 in database 130. In some embodiments, the group may be defined as a category of items, such as "electronics", and the meta-data may be associated with that category.

At 710 either, or both, the conversion factor and the aggregate sales factor may be used as components in an item listing quality score for the third set 408 of item listings 304. In some embodiments 710 operates as 608 in FIG. 6, with the addition of the aggregate sales factor. In some embodiments 710 operates as 608 in FIG. 6 except that the seller conversion factor is replaced by the aggregate sales factor.

By combining seller 302 listings for related items, a more accurate quality assessment of a given item listing 304 may be made. For example, given 10 items, if each item is separately listed and half are sold given 10 impressions each, those successful listings may suggest a 50% probability of a similar listing of being successful. However, for accuracy, the unsuccessful listings should also be considered. Using the aggregated sales over impression, or aggregate sales, factor, one finds that the probability of a similar listing being successful is 5%.

Figure 8:
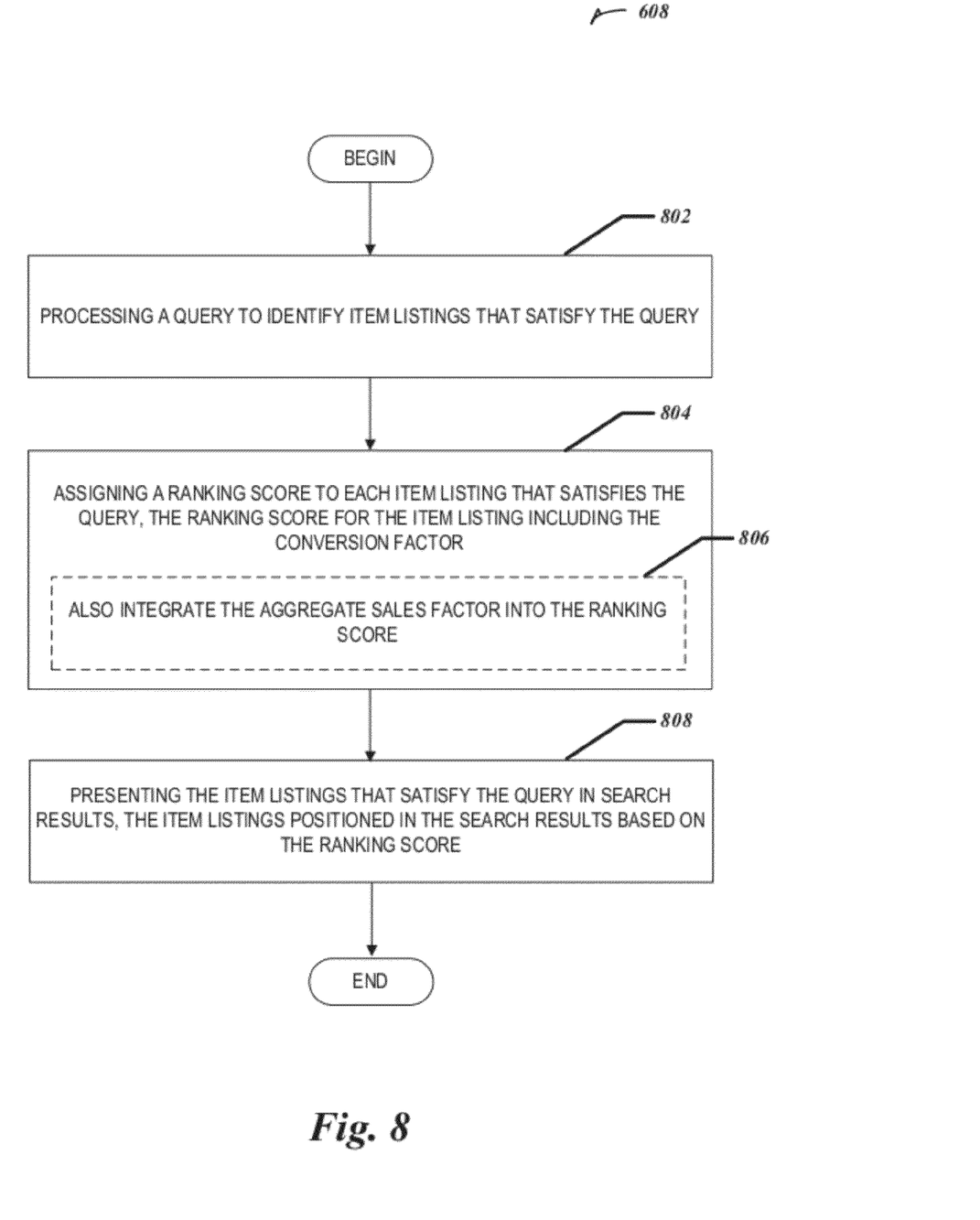
FIG. 8 illustrates an example method of using the seller conversion factor to influence the presentation of item listings.

FIG. 8 illustrates an example method 608 of using the seller conversion factor to influence the presentation of item listings 304.

At 802 a user query may be processed to identify item listings 304 that satisfy the query. In some embodiments 802 may be performed by the search engine module 220 previously described with respect to FIG. 2.

At 804 a ranking score may be assigned to each item listing that satisfies the query; the ranking score including the conversion factor.

At 806 the ranking score may optionally include the aggregate sales factor.

In some embodiments of 804 and 806, the methods and systems described in U.S. application Ser. No. 12/476,046, entitled, "METHODS AND SYSTEMS FOR DERIVING A SCORE WITH WHICH ITEM LISTINGS ARE ORDERED", filed on Jun. 1, 2009, may be used to assign the ranking score, using the seller conversion factor as one component of an item listing quality score. In some embodiments the conversion factor may be calculated before the query is processed to identify item listings 304 satisfying the query. For example, the conversion factor calculation may be performed periodically (e.g., month to month, year to year, etc.), or it may be performed episodically (e.g., when a seller initiates a new item listing). Pre-calculating the conversion factor, or the aggregate sales factor, may allow for better resource management for the online marketplace.

At 808 the item listings 304 satisfying the query may be presented to the user in search results, where the search results are based on the ranking score. In some embodiments the presentation module 224, previously described with respect to FIG. 2, may implement 808. In some embodiments the conversion factor may be used to demote an item listing's 304 position in the search results if the conversion factor crosses a predefined value—otherwise leaving the item listing's 304 position undisturbed. In some embodiments, the demotion may be fixed, stepped, or a ratio between the conversion factor and the predefined value. Thus, the predefined value may act as a threshold, detecting and deterring abuse by sellers 302.

Seller gaming of an online marketplace's search result ranking system by creating listings for the sole purpose of driving buyer traffic to other listings may be automatically reduced using the seller conversion factor. By comparing a seller's listings with the number of successful listings, and penalizing a seller's active listings when an excessive number do not result in transactions, sellers may be discouraged from creating listings that are unlikely to convert into a sale. Further, by using the seller conversion factor as a component of an item listing's ranking score, the seller conversion factor may be flexibly administered vis a vis other factors important to the online marketplace.

Example Computer System

Figure 9:
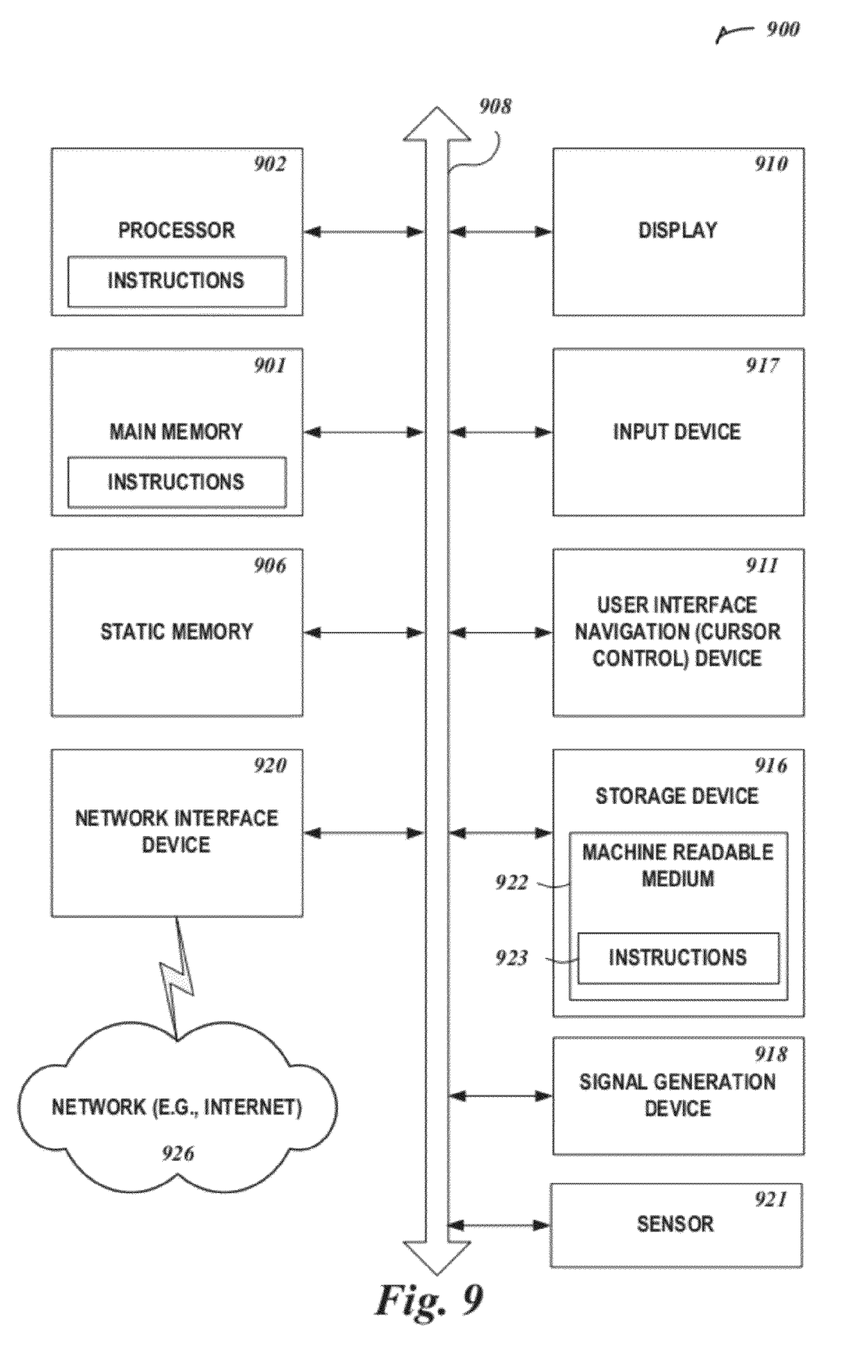
FIG. 9 is a block diagram illustrating an example machine upon which any one or more of the methodologies herein discussed may be run.

FIG. 9 is a block diagram illustrating an example machine upon which any one or more of the methodologies herein discussed may be run. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 901 and a static memory 906, which communicate with each other via a bus 908. The computer system 900 may further include a display unit 910, an alphanumeric input device 917 (e.g., a keyboard), and a user interface (UI) navigation device 911 (e.g., a mouse). In one embodiment, the display, input device and cursor control device are a touch screen display. The computer system 900 may additionally include a storage device (e.g., drive unit 916), a signal generation device 918 (e.g., a speaker), a network interface device 920, and one or more sensors 921, such as a global positioning system sensor, compass, accelerometer, or other sensor.

The drive unit 916 includes a machine-readable medium 922 on which is stored one or more sets of instructions and data structures (e.g., software 923) embodying or utilized by any one or more of the methodologies or functions described herein. The software 923 may also reside, completely or at least partially, within the main memory 901 and/or within the processor 902 during execution thereof by the computer system 900, the main memory 901 and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 923 may further be transmitted or received over a communications network 926 using a transmission medium via the network interface device 920 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other examples or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a tangible computer-readable medium or tangible machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. In an online marketplace with sellers and item listings, a computer-implemented method comprising:
    calculating a first sum by identifying a first set of item listings associated with a seller, the first set of item listings being a subset of all item listings associated with the seller;
    calculating a second sum by identifying a second set of item listings, the second set of item listings being successful item listings and a subset of the first set of item listings;
    calculating, using one or more processors, a conversion factor from the first sum and second sum by dividing the second sum by the first sum; and
    using the conversion factor as a component in an item listing quality score for a third set of item listings that are a subset of all item listings associated with the seller, using the conversion factor including:
        assigning a ranking score to an item listing in the third set of item listings that satisfies a query, the ranking score for the item listing including the conversion factor; and
        presenting the item listing in search results, the item listing positioned in the search results based on the ranking score, the conversion factor demoting the item listing's position if the conversion factor exceeds a threshold score and the conversion factor does not affect the item listing's position if the conversion factor does not exceed the threshold score.

2. The computer-implemented method of claim 1, wherein a successful item listing is an item listing that has previously concluded in a sale.

3. The computer-implemented method of claim 1, wherein calculating the conversion factor includes storing the conversion factor in meta-data associated with the seller.

4. The computer-implemented method of claim 1, wherein the third set of item listings include all active item listings associated with the seller.

5. The computer-implemented method of claim 1, wherein the first set of item listings include at least one of item listings offered via auction in the online marketplace that have ended within a predefined time period prior to calculating the conversion factor, or item listings offered via a fixed-price that have been active within a predefined time period prior to calculating the conversion factor.

6. The computer-implemented method of claim 5, wherein the predefined time period is sixty days.

7. A system comprising:
    one or more processors;

a conversion factor calculating module executing on the one or more processors and configured to:
  calculate a first sum by identifying a first set of item listings associated with the seller, the first set of item listings being a subset of all item listings associated with the seller;
  calculate a second sum by identifying a second set of item listings, the second set of item listings being successful item listings and a subset of the first set of item listings; and
  calculate a conversion factor from the first sum and second sum by dividing the second sum by the first sum; and
a ranking score assignment module configured to use the conversion factor as a component in an item listing quality score for a third set of item listings that are a subset of all item listings associated with the seller, wherein to use the conversion factor, the ranking score assignment module is configured to:
  use an assignment module to assign a ranking score to an item listing in the third set of item listings that satisfies a query, the ranking score for the item listing including the conversion factor; and
  use a presentation module to present the item listing in search results, the item listing positioned in the search results based on the ranking score, and the conversion factor demotes the item listing's position if the conversion factor exceeds a threshold score and the conversion factor does not affect the item listing's position if the conversion factor does not exceed the threshold score.

8. The system of claim 7, wherein a successful item listing is an item listing concluding in a sale.

9. The system of claim 7, wherein to calculate the conversion factor includes storing the conversion factor in meta-data associated with the seller.

10. The system of claim 7, wherein the first set of item listings include at least one of item listings offered via auction in the online marketplace that have ended within a predefined time period prior to calculating the conversion factor, or item listings offered via a fixed-price that have been active within a predefined time period prior to calculating the conversion factor.

11. The system of claim 10, wherein the predefined time period is 60 days.

* * * * *